United States Patent

Gallery et al.

[11] Patent Number: 5,986,659
[45] Date of Patent: *Nov. 16, 1999

[54] BLURRING FOR COMPUTER GRAPHICS GENERATED IMAGES

[75] Inventors: Richard D. Gallery, Horley, Ireland; Paul A. Winser, Bristol, United Kingdom

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/548,246

[22] Filed: Oct. 25, 1995

[30] Foreign Application Priority Data

Nov. 2, 1994 [GB] United Kingdom .................. 9422089

[51] Int. Cl.⁶ ...................................................... G06F 15/00
[52] U.S. Cl. ........................................................... 345/419
[58] Field of Search .................................... 395/119, 133, 395/121, 122; 345/419, 421, 422, 433

[56] References Cited

U.S. PATENT DOCUMENTS

| | | | |
|---|---|---|---|
| 4,834,512 | 5/1989 | Austin | 345/139 |
| 5,025,400 | 6/1991 | Cook et al. | 364/200 |
| 5,317,644 | 5/1994 | Kenyon et al. | 382/133 |

FOREIGN PATENT DOCUMENTS

0610080A1  8/1994  European Pat. Off. .

OTHER PUBLICATIONS

"Synthetic Image Generation with a Lens and Aperture Camera Model" by M. Potmesil and I. Chakravarty, ACM Transactions on Graphics, vol. 1, No. 2, Apr. 1982, pp. 85–108.

"Two 2D Postprocessing Tools and Their Applications to the Improvement of 3D Pictures" by J–F. Colonna, The Visual Computer (1994), pp. 239–242.

"Computer Graphics—Principles and Practice" by Foley, van Dam, Feiner and Hughes Section Edition (1990) published by Addison Wesley, ISBN 0–201–12110–7.

Primary Examiner—Phu K. Nguyen
Attorney, Agent, or Firm—Steven S. Rubin

[57] ABSTRACT

A post-processing method and apparatus to produce focus/defocus effects in computer generated images of three dimensional objects. A convolution filter stores pixel values (V) and associated depth values (Z) with a filter kernel being selected from a look-up table in dependence of the depth of the centre pixel ($Z_c$) in relation to a specified focus depth (P). To minimize spurious effects where filter kernels overlap objects at different depths in the image, an inhibition function stage varies the amount by which each pixel contributes to the kernel in dependence on that pixel's depth value (Z) and the centre pixel and focus depth values ($Z_c$ and P). Inhibition profiles over a range of contributing and centre pixel values are provided.

13 Claims, 5 Drawing Sheets

BLURRING FOR COMPUTER GRAPHICS GENERATED IMAGES

The present invention relates to a method and apparatus for modifying computer generated images and, in particular, for simulation of focusing/defocusing effects in three-dimensional images for display in two dimensions.

BACKGROUND OF THE INVENTION

Synthetically generated computer graphics images normally suffer from the deficiency of being uniformly sharp, i.e. all parts of the image appear to be in focus. This is an un-natural effect, but simulating the effects of focus/defocus is often highly expensive both in terms of computational power and memory bandwidth. An example of such a technique is described in "Synthetic Image Generation with a Lens and Aperture Model" by M. Potmesil and I. Chakravarty, ACM Transactions on Graphics Vol.1, No.2, April 1982 at pp.85–108. The Potmesil technique is an extension of earlier ray-tracing methods (modelling light propagation as infinitely thin rays travelling in straight line paths) that allows the inclusion of a camera/lens/aperture model. This is a computaticnally expensive technique which is impractical for real-time systems: a minimum time to generate an image at minimum distortion (highest aperture number) in excess of two and a half minutes is quoted, with processing time increasing as the aperture number is reduced.

An alternative and simpler technique is described in "Two 2D Postprocessing Tools and their Applications to Improvement of 3D Pictures" by J-F. Colonna, The Visual Computer (1994), at pp.239–242. Colonna describes a post-processing tool which uses a variable length convolution filter to provide an impression of depth in an image by increasing variation in filter length at increasing distance along the z-axis (towards foreground or background) from a focus depth. A particular problem likely to be encountered occurs at sharply receding surfaces and depth discontinuities, for example at the edge of a foreground object overlying a distant background: including in the filter kernel pixels of widely differing depth values can lead to inaccuracies and these will become particularly noticeable for objects at or close to the focus depth.

Accordingly, it is an object of the present invention to provide a computationally inexpensive technique that does not suffer from effects caused by depth discontinuities.

SUMMARY OF THE INVENTION

In accordance with the present invention there is provided a method for post-processing a computer-generated image of a three-dimensional object for display as a series of pixels, having a respective depth value for each pixel and a focus depth specified for each image frame, wherein each image pixel is filtered using contributions from other pixels of the image about the image pixel and with filter coefficients determined by the image pixel depth value and focus depth, characterised in that filter contributions are selectively inhibited by an amount determined, for each contributing pixel, by an inhibition function. This inhibition function may suitably relate the contributing pixel depth value, the image pixel depth value, and the focus depth.

By controllably varying the level of contributions from pixels the previously mentioned problems at depth discontinuities may be avoided. In order to improve the appearance further, the boundaries of near (out-of-focus) objects with middle-distance focused objects should be somewhat blurred whilst boundaries between middle distance in-focus objects and background (unfocused) objects should be sharp. To achieve this the inhibition function may set a predetermined minimum inhibition level for all filter contributions when the image pixel depth value is less than the focus depth.

For image pixel depth values greater than or equal to the focus depth, inhibition is preferably set to a maximum level (such as 1) for contributing pixels having a depth value substantially the same as the focus depth. This however would be reduced as contributing pixel depth diverges from the focus depth until inhibition reaches a predetermined minimum level (suitably 0) or the contributing pixel and image pixel depth values are coincident following which the inhibition level is constant for all contributing pixels further from the focus depth. Such an inhibition profile, together with means for implementing it, will be discussed hereinafter with reference to an exemplary embodiment.

A maximum and minimum field depth may be specified (within which range all pixel depth values lie) with reduction in inhibition level being substantially linear from the maximum value at the focus depth to the minimum level at each of the maximum and minimum field depth values. Alternatively, a focus field may be specified with maximum and minimum focus field depth values at respectively greater and lesser depths than the focus depth. With such a focus field, reduction in inhibition level is substantially linear from the maximum value at the focus depth to the minimum value at each of the maximum and minimum focus field depth values. The focus field may suitably be defined in terms of the focus depth, for instance as a predetermined depth range having the focus depth at its centre. This would reduce the amount of recalculation necessary for the inhibition profile as a result of a change in the focus depth. The filtering of each image pixel may suitably comprise convolution filtering, with the filter kernel taking contributions from pixels close to the image pixel.

The present invention also relates to image processing apparatus for effecting the above-mentioned method which, together with further features and advantages of the present invention, is described in the following pages of description and claims to which reference should now be made.

BRIEF DESCRIPTION OF THE DRAWINGS

Preferred embodiments of the present invention will now be described, by way of example only, and with reference to the accompanying drawings in which.

DETAILED DESCRIPTION OF THE PREFERRED EMBODIMENTS

The following description assumes that an image has been rendered with traditional Z-buffering techniques as described in, for example, "Computer Graphics: Principles and Practice" by Foley, van Dam, Feiner and Hughes, 2nd Edition (1990), published by Addison-Wesley, ISBN 0-201-12110-7, at pages 668–672. Such techniques will be familiar to the skilled practitioner and, for the purposes of illustrating the present invention, it will be sufficient to consider that for each pixel we have a set of values V representing the colour of an individual pixel, and that for that pixel we also have the value Z representing the z, or depth value of that pixel.

Figure 1:
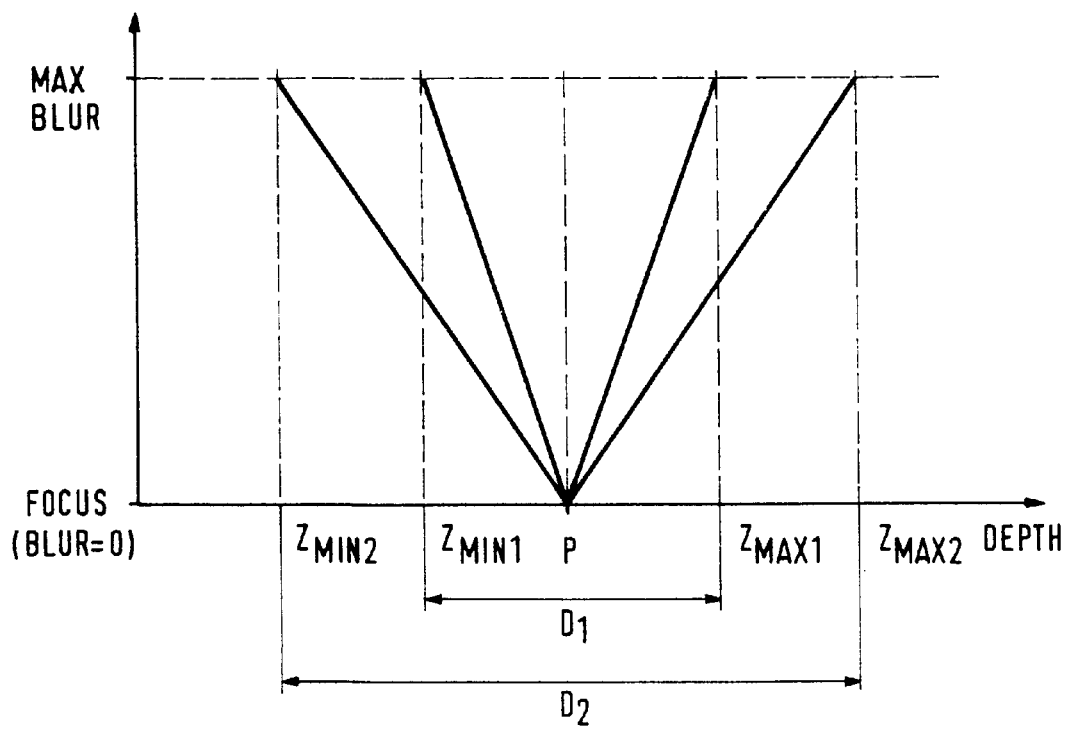
FIG. 1 represents variation in the rate of increase of blurring in relation to field depth.

Specifying a point of focus P (a depth value at the place in the image that the observer is looking at), in order to give the appearance of focus/de-focus it is assumed that for pixels in the image with depth close to that of the point of focus the image should be sharp, but, as the depth of a pixel gets further away from the depth of the point of focus (whether nearer or closer to the position of the observer) then the image should become more blurred. The extent of blurring for any given deviation from the point of focus P would be determined by a further value, the depth of field D. The depth of field D is the difference between the maximum and minimum z-values supported and suitably the increase in the extent of blurring is greater for small magnitudes of D. As shown in FIG. 1, for a specified maximum extent of blurring, the blurring will increase more rapidly for a set shift in depth when the magnitude of D is smaller ($D_1 = Z_{max1} - Z_{min1}$) than for a larger depth of field ($D_2 = Z_{max2} - Z_{min2}$).

The technique for giving the appearance of focus/de-focus applies a convolution filter at each pixel in the image: an explanation of the general technique of convolution filtering may be found in the above-mentioned textbook of Foley et al at pages 628–634. This filter is chosen, for each pixel, such that at pixels in the image with depth close to that of the point of focus P the filter has little or no effect. As the depth of a pixel gets further away from the depth of the point of focus the filter should blur the image more and more as shown in FIG. 1. This corresponds to applying a variable length (in x and y) blurring filter across the image to the values V at each pixel, with the length of the filter adapting on the basis of a comparison of the depth value of the object of interest with the depth value of the point of focus.

We have appreciated that it may not be visually acceptable to apply a filter that combines the values of objects that are not at the same z-value. At a pixel whose depth value differs substantially from P, the convolution filter is chosen to have a large area so that considerable defocusing is attained. However, if the convolution area extends to nearby pixels which represent an object close to the point of focus, such pixels will generally be suppressed from the filter since their image should remain sharply in focus although this does not always hold true as will be described below. Generally, the filter for each pixel is formed based upon whether or not the depth value of the pixels to be included in the convolution filter ($Z_i$) is similar to that of the depth value of the pixel at which the filter is to be applied ($Z_c$). Specifically, the coefficient factor of each input pixel to the convolution filter is weighted by an inhibition value determined by a function relating the input pixels $Z_i$ and $Z_c$ and the point of focus P. A suitable function will be described in detail below.

The processing required to implement the blurring algorithm is applied as a post-processing technique, that is to say to a complete generated picture. It could be performed, for example, as the image is read out of the display buffer to the screen. In synchronisation, the depth values for the pixels would also be read from the Z-buffer memory. As will be appreciated, this requires that the Z-buffer memory be double-buffered in the same way that the display buffer is, so that Z values remain available for the displayed frame, while the next frame is being generated.

Figure 2:
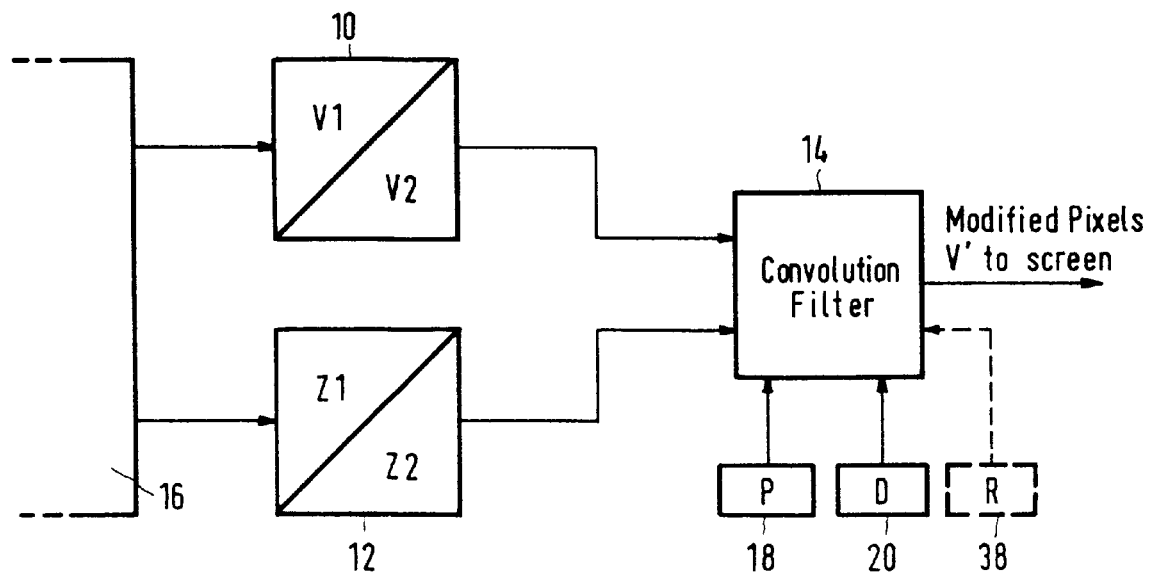
FIG. 2 shows an arrangement of buffer memories in relation to a convolution filter embodying the present invention.

FIG. 2 shows the arrangement of the double frame buffer 10, the double Z-buffer 12 and convolution filter 14, with the buffers receiving respective outputs from an image source 16 and the convolution filter 14 outputting a stream of modified output pixel values V' to a display. The frame buffer and Z-buffer have substantially identical capacities: for a 384×256 pixel screen, with 3 bytes per pixel (for RGB), approximately 60k bytes are required to store two full frames. The corresponding 3 bytes (24 bits) allocated per Z-value is sufficient to allow for relatively fine depth resolution. Further inputs 18,20 to the convolution filter 14 are shown for the point of focus P and the depth D respectively. These values may be determined by the system or one or both may be input by a user in which case inputs 18 and 20 would be connected to receive signals from a suitable user input device such as a keyboard. A further (optional) input 38 for a range value R (the function of which will be described below) is shown in dashed lines: as with P and D, R may be set by the system or a user. Typically, the values of P and D (and R) will remain constant for a frame, although it would be possible to alter their values over specific sub-regions of an image if the effect were desired.

The action of the convolution filter may be represented by $$V' = \frac{\sum_i k_i \cdot F(Z_i, Z_c P) \cdot V_i}{\sum_i k_i \cdot F(Z_i, Z_c P)}$$

where V'=output pixel value
Z=input pixel depth values
F=filter inhibition function
i=all input pixels to convolution kernel.
V=input pixel value
P=point of focus depth value
k=coefficient of chosen filter kernel.

Figure 3:
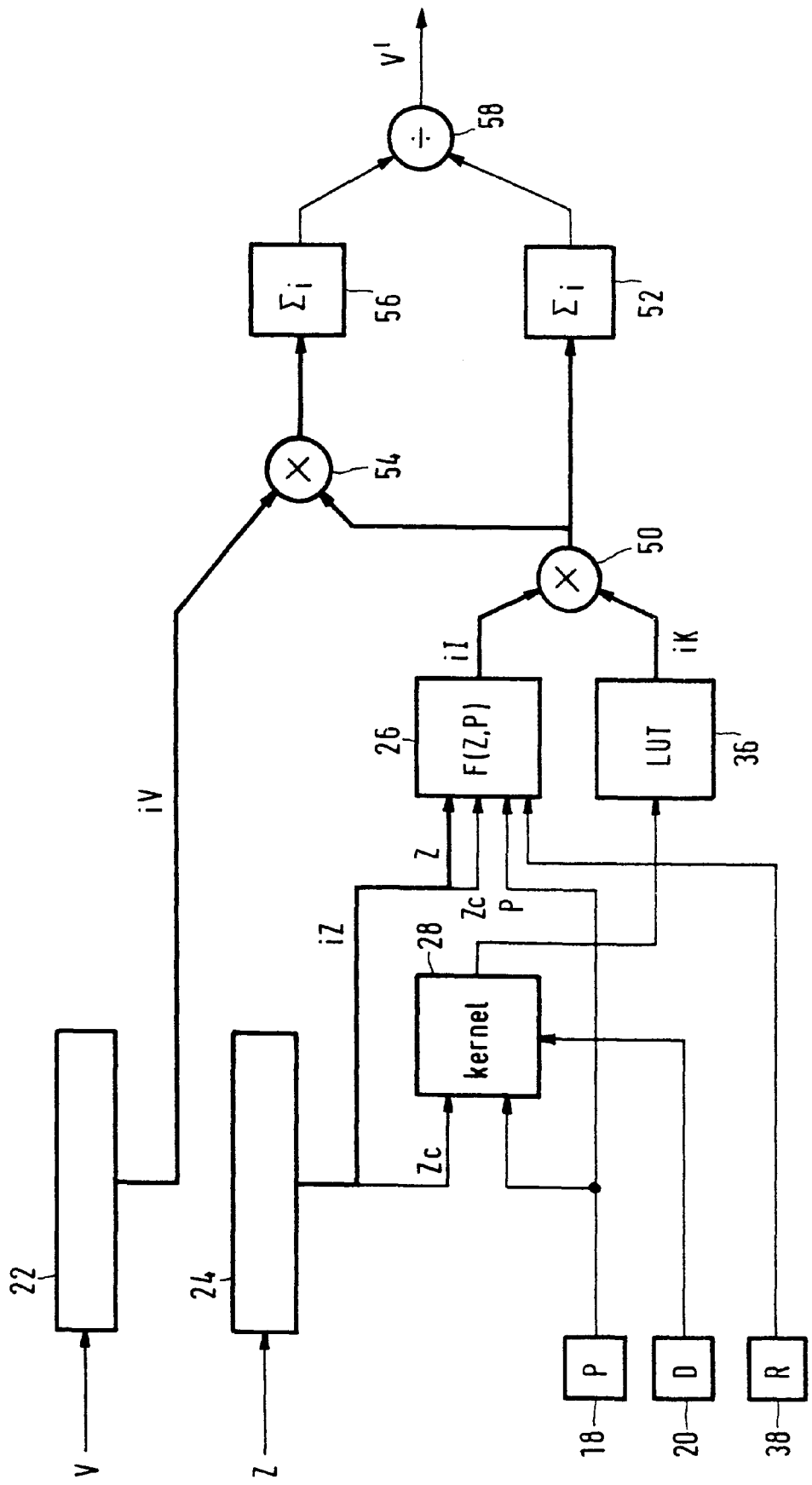
FIG. 3 schematically illustrates the operational stages of the filter of FIG. 1.

In block diagrammatic form, the convolution filter 14 is shown in detail in FIG. 3. The convolution kernel is of some arbitrary size, covering i pixels, and might for example be a 5×5 pixel area. Inputs from the V and Z buffers (10,12: FIG. 2) are fed to respective line stores 22,24. Assuming conventional frame-buffer read-out, the line stores are required to have sufficient capacity to hold enough complete display lines of pixels to allow for the filtering operation.

The i depth values of the convolution kernel, including that of a current pixel $Z_c$, are read out of the Z line store 24 to a function stage F(Z,P) 26 to be described below. The current pixel value $Z_c$ is also passed to a kernel selection stage 28 together with the input P and D values.

Figure 4:
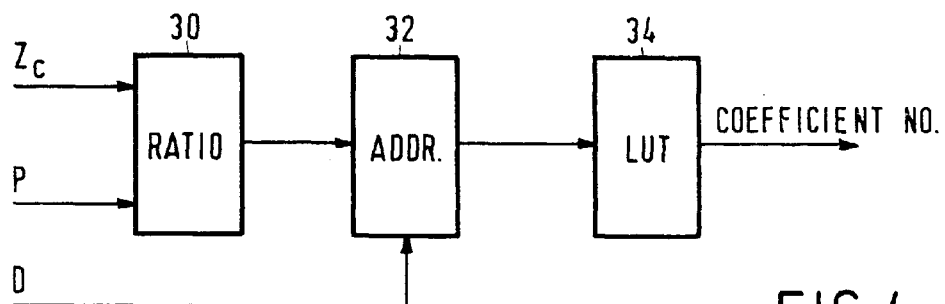
FIG. 4 schematically illustrates further features of the kernel selection stage of FIG. 3.

The kernel selection stage, shown schematically in FIG. 4, has a first stage 30 determining a relational value between $Z_c$ and P: the stage may comprise a simple divider to output a ratio of the respective depth values. A second stage 32 generates an address based on the first stage output and depth of field D which address is passed to a look-up table (LUT) 34 causing the LUT to output a numerical value to a further LUT 36 of coefficients (FIG. 3).

The coefficient look-up table 36 contains an arbitrary number of complete sets of filter kernels, for application to pixels near, far, and further from the point of focus. For pixels at a depth equal to the point of focus P, the kernel would have zero values at all locations other than the centre pixel, which would have a coefficient of unity, and this kernel would thus have no effect on those pixels at the point of focus. Kernels for pixels further from P would have a progressively greater blurring effect.

The controlled suppression (inhibition) of filter kernels will now be described with reference to FIGS. 5 and 6 which show the inhibition profiles for kernel centre pixels (also referred to as current or image pixels) having a depth $Z_c$ respectively greater than (or equal to) and less than the focus depth P. The two profiles are necessary to give a visually accurate effect at points where objects at different depths overlap. Specifically, the border between an out-of-focus foreground object and an object in focus at middle distance should be blurred, whereas the border between an in-focus object at middle distance and an out-of-focus background object should be sharp.

Figure 5:
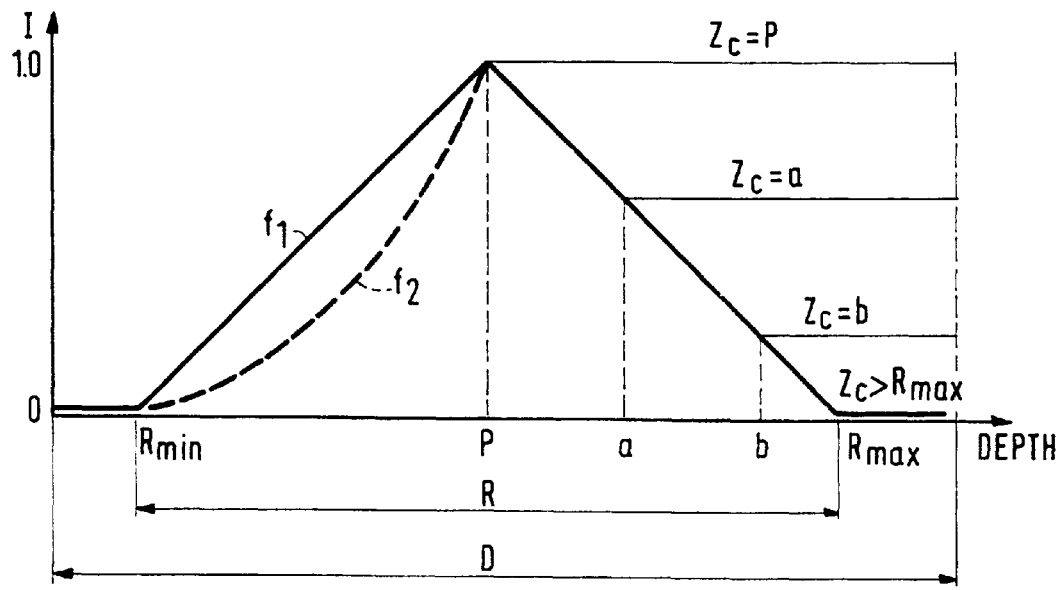
FIGS. 5 and 6 show variation in inhibition of filter kernel pixel contributions in relation to pixel and focus depth.
Figure 6:
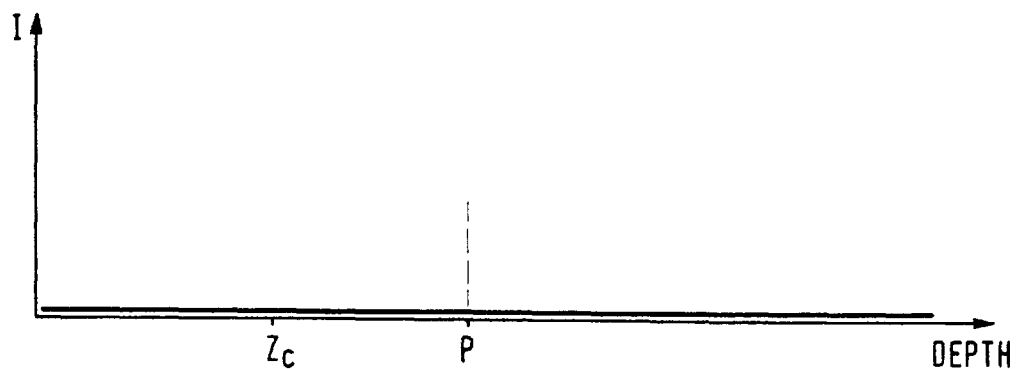

The inhibition factor I ranges from 0 (no inhibition or reduction in a pixel's contribution to the kernel) to 1 (full inhibition). For all cases where $Z_c$ is less than P, that is to say filter kernels centred on a foreground out-of-focus object, I=0 and no pixels are inhibited from the kernel, as shown in FIG. 6.

Where the kernel is centred on a pixel at or behind the focus depth P, the inhibition profile will follow the form of FIG. 5 in which four profiles (for four different values of $Z_c$) are shown. For all profiles, inhibition is maximised (I=1) for contributing pixels at the focus depth P: this prevents blurring at the focus depth and, where $Z_c$ is centred on an object behind P, inhibiting contributions from objects at the focus depth maintains the sharp border. Similarly for all profiles, the extent of inhibition of contributions from pixels in front of the focus depth is gradually reduced as the distance from P increases. A linear reduction in I is shown at f1 which is preferred for ease of implementation although a more optically appropriate reduction would be an exponential or similar reduction as shown in dashed lines at f2.

For contributing pixels from between P and $Z_c$ the extent of inhibition follows a linear reduction as the distance from P increases until the contributing pixel depth equals $Z_c$ following which all pixels are treated to the same level of inhibition. In this way, pixels in the far background (greatest depth) will have less effect where $Z_c$ is close to P but increasing effect as $Z_c$ recedes towards the blurred background.

Whilst the linear reduction of I on either side of P may be effected by ramping down from I=1 at P to I=0 at the foremost ($D_{min}$) and rearmost ($D_{max}$) extents of the field depth, a preferred alternative is to specify a focus range R over a predetermined range of depth values suitably centred on P. The value of R may be input by a user or calculated by the system, possibly taking into account P (making half of R equal to the distance from P to the nearer of $D_{max}$ and $D_{min}$) or D (specifying R as, for example, 80% of D). Having R centred on P achieves the simplification of having the same reduction gradient (although reversed) on either side of P which gradient does not alter as the focus depth varies. The benefit of this simplification will become more apparent hereinafter in respect of a hardware implementation of the function stage.

Figure 7:
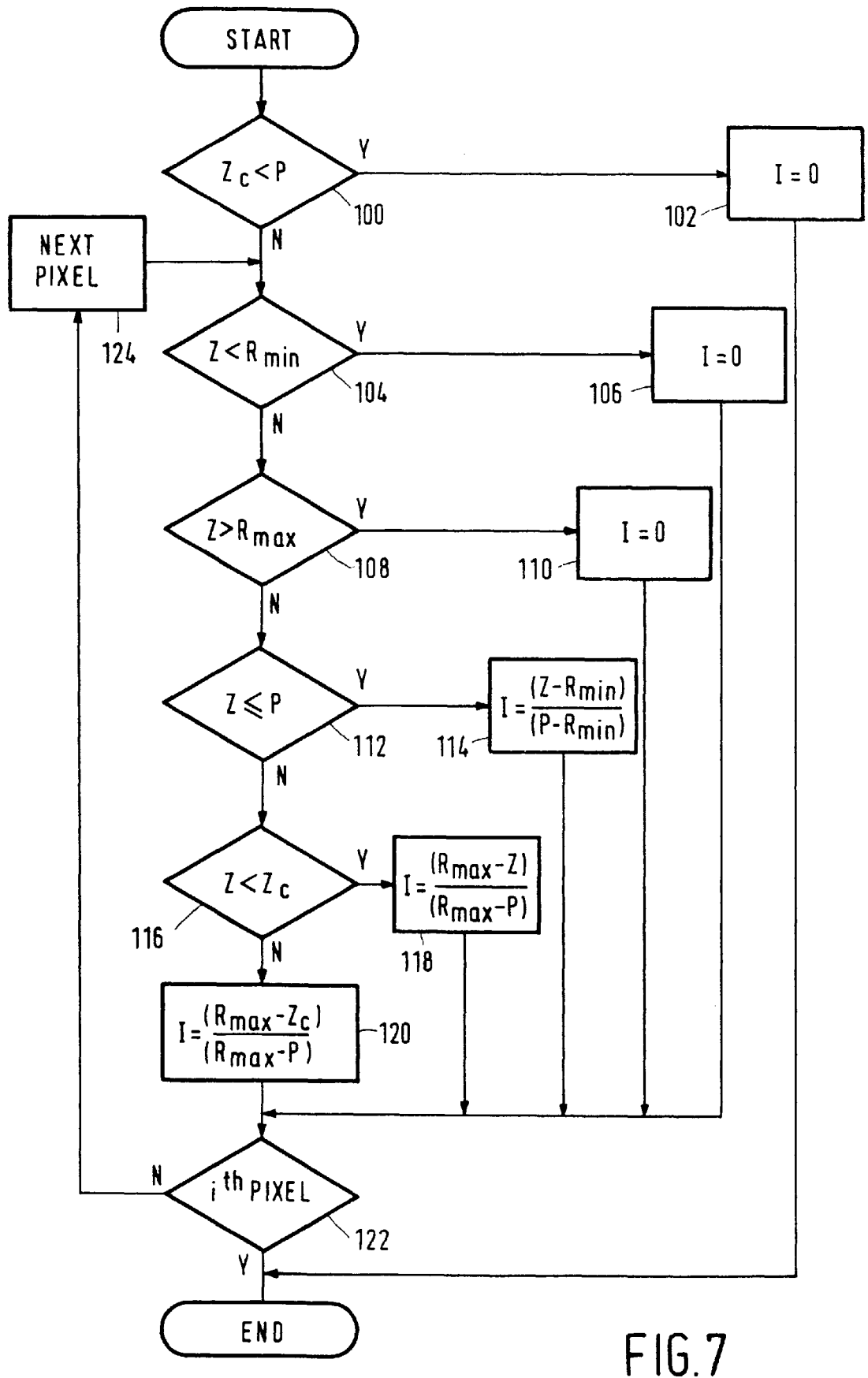
FIG. 7 is a flow chart representing the inhibition selection process in the filter function stage of FIG. 3.

The operation of the function stage to select and implement the appropriate inhibition profile is shown by the flowchart of FIG. 7. In a first step 100, the special case of $Z_c$ being less than P is checked and, if true, I is set to zero (at 102) for all kernel contributions as in FIG. 6. If step 100 does not hold, a check is made (steps 104,108) to see whether the contributing pixel depth value lies outside the focus range R and, if so, I is set to zero for that pixel (steps 106,110) as can be seen in FIG. 5. The next steps (112,116) determine where the pixel lies in relation to P and $Z_c$ and set I accordingly (at steps 114,118 or 120). Finally, an iteration loop (122,124) causes the process to be repeated from step 104 onwards until the values of I have been determined for all i pixels in the kernel.

Accordingly, the inhibition profile of FIG. 5 (for $Z_c$ behind P) may be specified as shown in Table 1 below for increasing values of z from $D_{min}$ to $D_{max}$

TABLE 1

| z | I |
|---|---|
| $D_{min}$ to $R_{min}$ | 0 |
| $R_{min}$ to P | $(z - R_{min}) \cdot 1/(P - R_{min})$ |
| P to $Z_c$ | $(R_{max} - z) \cdot 1/(R_{max} - P)$ |
| $Z_c$ to $R_{max}$ | $(R_{max} - Z_c) \cdot 1/(R_{max} - P)$ |
| $R_{max}$ to $D_{max}$ | 0 |

Figure 8:
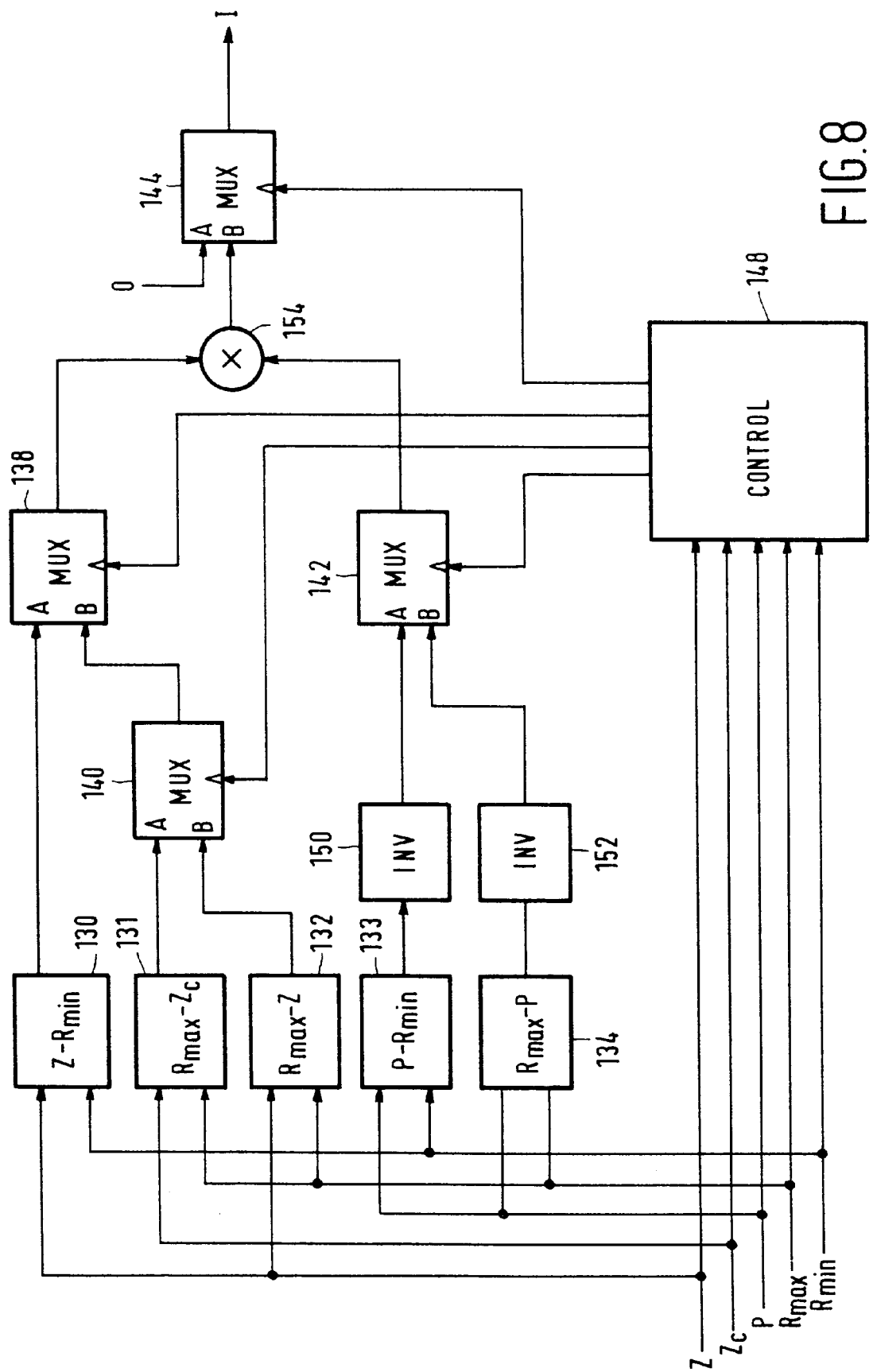
FIG. 8 shows a hardware implementation of the flow chart of FIG. 7.

A hardware implementation of the filter (inhibition) function is shown in FIG. 8 comprising five subtractors 130 to 134, four controlled switches or multiplexers MUX 138, 140,142,144, a control unit 148 controlling operation of the switches, two inverse value generators (dividers) INV 150, 152 and a multiplier 154. Values of z, $Z_c$, P, $R_{max}$ and $R_{min}$ are input to the control unit 148 and also to appropriate ones of the subtractors 130 to 134 such that they respectively output values for $z-R_{min}$, $R_{max}-Z_c$, $R_{max}-Z$, $P-R_{min}$ and $R_{max}-P$. Under control of the control unit 148 and in dependence on the values of z, $Z_c$ and P (analogous to steps 112 and 116 of FIG. 7), switches 138 and 140 select the appropriate numerator and switch 142 (following inverters 150 and 152) the appropriate denominator such that multiplier 154 outputs the appropriate value of I for all values of z between $R_{min}$ and $R_{max}$. For the special cases ($Z_c$ less than P, z outside focus range R) the control unit causes switch 144 to select a zero input rather than the output of multiplier 154. The control unit 148 is a simple logical switching circuit and may for example comprise a series of comparators arranged to carry out the determination steps 100,104,108,112 and 116 from FIG. 7 and cause appropriate switching of switches 138,140,142 and 144.

With each of the switches 138 to 144 having a pair of inputs A and B as shown in FIG. 8, the switch settings are as shown below in Table 2, with the left-hand values being determined in the order shown, following FIG. 7. Where no setting is shown, the inputs to that switch are not necessary for the output inhibition factor and the switch may take either setting.

TABLE 2

|  | 138 | 140 | 142 | 144 |
|---|---|---|---|---|
| $Z_c$ less than P | — | — | — | A |
| z less than $R_{min}$ | — | — | — | A |
| z greater than $R_{max}$ | — | — | — | A |
| z less/equal to P | A | — | A | B |
| z less than $Z_c$ | B | B | B | B |
| z greater/equal to $Z_c$ | B | A | B | B |

Variations on the circuit of FIG. 8 will be apparent to the skilled practitioner. For example, the two inverse value generators INV 150,152 may be replaced by a single inverter between switch 142 and multiplier 154. Also, as suggested previously, where R is centred on P, the outputs of subtractors 134 and 133 will always be equal and hence subtractor 134, inverter 152 and switch 142 may be omitted.

Where R is not specified, and the inhibition profile is determined on the basis of D, the R input to the function stage 26 (FIG. 3) is replaced by input of D, the references to $R_{max}$ and $R_{min}$ in the preceding description and FIGS. 7 and 8 are replaced with $D_{max}$ and $D_{min}$, and steps 104,106,108 and 110 are omitted from FIG. 7.

Returning to FIG. 3, the output inhibition values I of the function stage 26, for the i pixels of the filter kernel, are multiplied (at multiplier 50) by the respective i coefficients k output from the coefficient look-up table 36. The result is summed over the i values by summation circuit 52. The i outputs of multiplier 50 are also input to a further multiplier 54 where they are multiplied by respective ones of the i input pixel values V read out of line store 22. The outputs of multiplier 54 are summed over the i values by a further summation circuit 56. The output of the summation circuit 56 is divided by that from summation circuit 52 by divider 58, the output of which provides the modified pixel value V' to be passed to a display screen.

As will be appreciated from the foregoing, the present invention provides a relatively simple and computationally inexpensive (capable of realisation in hardware) technique for providing focus/defocus effects to computer generated graphics. As a post-processing technique, modification of the graphics generator is avoided although the present invention could of course be incorporated into such a generator as an output stage.

From reading the present disclosure, other modifications will be apparent to persons skilled in the art. Such modifications may involve other features which already known in the field of graphics manipulating and processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of post-processing a computer-generated image of a three-dimensional object for display as a series of pixels, each pixel having a respective depth value and a focus depth specified for each image frame said method comprising:

filtering a target pixel of said pixels using contributions from all contributing pixels of said pixels of the image disposed within a predefined kernel area proximate to said target pixel and using filter coefficients determined by the target pixel depth value and focus depth, said filter contributions being selectively inhibited by an inhibition function determined for each contributing pixel.

2. A method as claimed in claim 1, wherein the inhibition function relates to the contributing pixel depth value, image pixel depth value, and focus depth.

3. A method as claimed in claim 2, wherein the inhibition function sets a predetermined minimum inhibition level for all contributing pixels when the image pixel depth value is less than the focus depth.

4. A method as claimed in claim 2, wherein for image pixel depth values greater than or equal to the focus depth, said inhibition function is set to a maximum level for contributing pixels having a depth value substantially the same as the focus depth, and said inhibition function is reduced as contributing pixel depth diverges from the focus depth until said inhibition function reaches a predetermined minimum level or the contributing pixel and image pixel depth values are coincident following which the inhibition function level is constant for all contributing pixels further from the focus depth.

5. A method as claimed in claim 4, wherein all pixel depth values fall within a maximum and minimum field depth and wherein reduction in inhibition function level is substantially linear from a maximum value at the focus depth to a minimum value at both the maximum and minimum field depth values.

6. A method as claimed in claim 4, further comprising the step of: providing a focus field specified with maximum and minimum focus field depth values at respectively greater and lesser depths than the focus depth, wherein reduction in inhibition function level is substantially linear from a maximum value at the focus depth to a minimum value at both the maximum and minimum focus field depth values.

7. A method as claimed in claim 6, wherein the distance from the minimum focus field depth to the focus depth is substantially the same as that from the focus depth to the maximum focus field depth.

8. A method as claimed in claim 6, in which the inhibition function level is set to the minimum value for contributing pixel depth values outside the maximum and minimum focus field depth value.

9. A method as claimed in claim 1, wherein each target pixel is convolution filtered with said contributing pixels.

10. An image processing apparatus comprising:

a buffer memory arranged to receive and store a plurality of pixel values with associated depth values;

a filter connected to receive target and contributing pixel values and depth values corresponding to target and contributing pixels, said filter operable to perform filtering on the basis of the image pixel depth value a focus depth value, and all of said contributing pixels, said contributing pixels being disposed within a predefined kernel area proximate to said image pixel;

and an inhibition generator operable to selectively inhibit the contribution of any pixel to the filter by an amount determined by an inhibition function.

11. An apparatus as claimed in claim 10, wherein the filter is a convolution filter and the buffer memory stores sufficient pixel values to cover the filter kernel.

12. An apparatus as claimed in claim 10, wherein the focus depth is controllably variable, and said apparatus further comprises user-operable input means for supplying focus depth values to the convolution filter.

13. A method for processing a three dimensional image for display as a plurality of pixels, said method comprising:

creating filter coefficients for each of said pixels, said filter coefficients being based on contributions from all pixels disposed within a predetermined kernel area proximate to a pixel to be filtered, said contributions being determined by at least one of pixel depth value and focus depth;

inhibiting said contributions by an inhibition function, thereby creating inhibited contributions; and filtering each pixel using said inhibited contributions.

* * * * *